United States Patent [19]

Tisbo et al.

[11] 4,030,664
[45] June 21, 1977

[54] SPRAYING AND WATERING CAN

[75] Inventors: Cosmo N. Tisbo, Barrington; Thomas A. Tisbo, Roselle, both of Ill.

[73] Assignee: Custom Plastics, Inc., Elk Grove Village, Ill.

[22] Filed: Apr. 12, 1976

[21] Appl. No.: 675,712

[52] U.S. Cl. .............................. 239/289; 222/385; 222/468; 222/481; 239/333; 239/377; 239/443; D9/175; D23/11

[51] Int. Cl.² ................... A01G 25/14; B05B 9/043

[58] Field of Search .......... 239/289, 333, 377, 436, 239/443; 222/372, 383, 384, 385, 465, 468, 478, 481; 215/1 R, 1 C; D9/47–49, 175, 290; D23/11; D7/66, 67

[56] References Cited

UNITED STATES PATENTS

| | | | |
|---|---|---|---|
| 2,081,798 | 5/1937 | Dinneen | 222/385 X |
| 3,199,739 | 8/1965 | Corning et al. | 239/333 X |
| 3,851,029 | 11/1974 | Cornet et al. | 215/1 C X |
| D192,619 | 4/1962 | Mojonnier | D9/175 |
| D196,146 | 8/1963 | Lello | D9/49 |
| D239,713 | 4/1976 | Solomon | D23/11 |

FOREIGN PATENTS OR APPLICATIONS

| | | | |
|---|---|---|---|
| 262,981 | 8/1949 | Switzerland | 239/333 |
| 12,015 | 7/1895 | United Kingdom | 239/377 |

*Primary Examiner*—John J. Love
*Assistant Examiner*—Andres Kashnikow
*Attorney, Agent, or Firm*—Anthony S. Zummer

[57] ABSTRACT

A spraying and watering can is herein disclosed. The spraying and watering can includes a container. The container includes a reservoir. A hollow carrying handle, having a vent hole formed therein, is connected to the reservoir. A spout is also connected to the reservoir. The spout is positioned below the vent hole. A sprayer is connected to the hollow carrying handle and to the reservoir. The spout is adapted to deliver a stream of water to a plant. The sprayer is adapted to deliver a water mist to the plant.

1 Claim, 3 Drawing Figures

SPRAYING AND WATERING CAN

BACKGROUND OF THE INVENTION

Proper care of house plants dictates that the house plants should receive adequate amounts of water for their health and growth. Most house plants are of the tropical variety which are originally grown in warm, moist climates, or are grown in greenhouses, usually having a high humidity. When such tropical plants are transferred from the greenhouse to a residence, which may often have low humidity, proper watering of the plants becomes especially important.

Most commonly, plants of the tropical variety which are kept in residences are simply watered from a watering can which delivers water to the soil of the plant. The water thus received in the soil is then drawn through a root system of the plant into a phloem and from there is transferred to a plurality of leaves where the water is used in the photosynthetic cycle to manufacture foodstuffs for the plant. Most tropical plants, as indicated above, are adapted to thrive in a humid environment. Thus, when transferred to an arid environment, such as a residence during winter, rapid evaporation of water takes place through pores in the leaves of the plant. Thus, the plant is rapidly dried out. One method of preventing this is to spray or mist the leaves of the plant periodically, often when watering is also being done.

The person who is caring for the plants then, must carry one container to water the plants, commonly a watering can, and at the same time, carry a separate container, usually quite small, which is a sprayer or mister. Commonly then, the watering and the spraying or misting takes place at approximately the same time. Usually the person first waters the plants and later returns and mists the plants. Since the two operations are usually performed separately, often one or more of the plants may be neglected and may be watered only or sprayed only.

What is needed then, is a device which is adapted to water and mist plants at the same time. The device should be inexpensive to manufacture and easy to use. The device should also be adapted to hold a reasonably large amount of water or other fluid.

SUMMARY OF THE INVENTION

A watering and spray can is herein disclosed. The watering and spray can includes a reservoir having a substantially rectangular configuration. A hollow carrying handle is connected to a lower portion of the reservoir. The hollow carrying handle is also connected to an upper portion of the reservoir. A sprayer is connected to the reservoir and the hollow carrying handle at a point where the hollow carrying handle enters the upper portion of the reservoir. The hollow carrying handle has a vent hole formed in an upper portion thereof. A curved spout is formed integral with the reservoir, opposite the hollow carrying handle. A tip of the curved spout is oriented so that its lower portion is below the vent hole in the handle.

The watering and spray can is filled by removing the sprayer pump and pouring water in through the aperture to which the sprayer pump is fitted. The sprayer pump is then fitted back on the aperture, and the watering and spray can is ready for use. The watering can may be used in the same manner as any other watering can simply by tipping the spout downward to pour water out of the spout. The vent hole allows the water to be poured from the spout in a steady stream so that there is no undue splashing. At the same time, the spray pump can be operated and can be pumped by a thumb of the person operating the watering and spray can to direct a mist onto foliage of the plant.

It is, therefore, a principal object of the present invention to provide a watering and spray can which is adapted to water a plant and at the same time to mist the plant.

It is another object of the instant invention to provide a watering and spray can having a sufficiently large reservoir to allow a number of watering and spraying operations from a single filling of the reservoir.

It is still another object of the instant invention to provide a watering and spray can which may be produced from a blow-molded plastic.

Other objects and uses of the present invention will become obvious to one skilled in the art upon a perusal of the following specification and claims in light of the accompanying drawing.

DESCRIPTION OF THE PREFERRED EMBODIMENT

Figure 1:
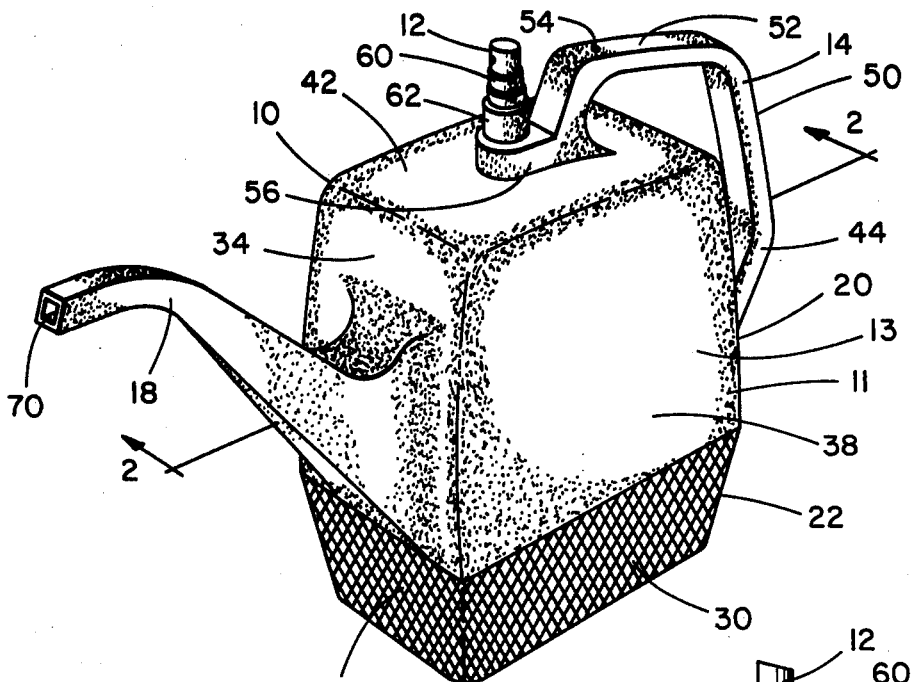
FIG. 1 is a perspective view of a spraying and watering can.
Figure 2:
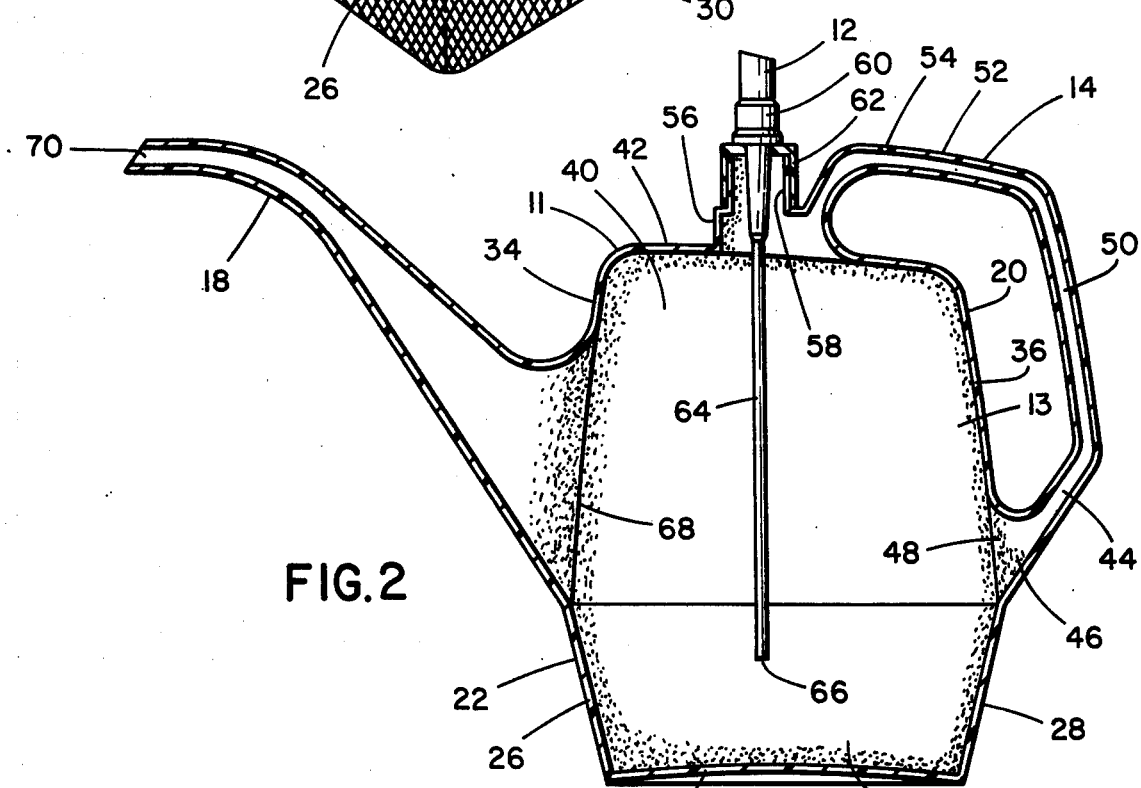
FIG. 2 is a cross-sectional view taken along line 2—2 of FIG. 1, showing details of the construction of the spraying and watering can.
Figure 3:
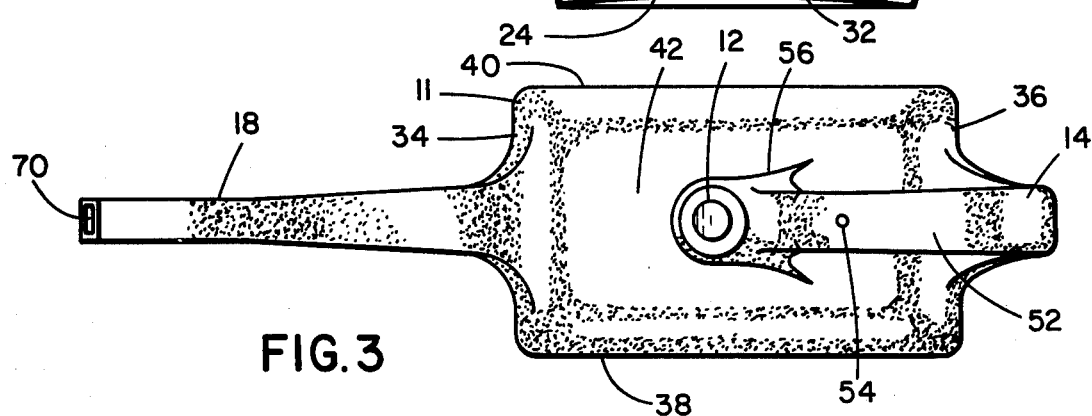
FIG. 3 is a top view of the spraying and watering can of FIG. 1, showing details of the symmetry of a spout, a sprayer, handle and a vent hole of the watering and spray can.

Referring now to the drawing, and especially to FIGS. 1 and 2, a spraying and watering can, embodying the instant invention, and generally indicated by numeral 10, is shown therein. Spraying and watering can 10 includes a container 11. A sprayer 12 is connected to container 11. Container 11 includes a reservoir 13. A hollow handle 14 is connected to reservoir 13. A spout 18 is formed integral with reservoir 13, opposite hollow handle 14.

Reservoir 13 is a substantially rectangular reservoir and includes an upper portion 20 and a lower portion 22. Bottom portion 22 includes a rectangular crowned bottom 24. Rectangular crowned bottom 24 is adapted to have a variety of legends imprinted thereupon. A textured front wall 26 is formed integral with crowned bottom 24. Textured front wall 26 is positioned slightly away from a vertical at approximately a 5½° angle with respect to the vertical. A substantially rectangular back wall 28 is also formed integral with crowned bottom 24, opposite front wall 26. Substantially rectangular back wall 28 is also textured and is positioned at approximately 5½° with respect to the vertical. A side wall 30 is formed integral with and approximately perpendicular to crowned bottom 24, front wall 26 and back wall 28. Side wall 30 is positioned 5½° away from the vertical and is also textured. Textured side wall 32 is formed integral with crowned bottom 24. Side wall 32 is also formed integral with front wall 26 and back wall 28. Side wall 32 is positioned at 5½° with respect to the vertical. Thus, bottom portion 22 has a general tapering shape which tapers toward crowned bottom 24.

A second rectangular front wall 34 forms a portion of upper portion 20. Rectangular front wall 34 is formed integral with front wall 26. Rectangular front wall 34 is disposed at an angle of 16½° with respect to front wall 26. A back wall 36, having a substantially rectangular configuration, is formed integral with back wall 28. Back wall 36 is also disposed at 16½° with respect to back wall 28. A side wall 38 is formed integral with side wall 30. Side wall 38 is positioned at approximately an angle of 16½° with respect to side wall 30. A side wall 40 is formed integral with front wall 34, back wall 36 and side wall 32. Side wall 40 is also positioned at a 16½° angle with respect to side wall 32. A top 42 is formed integral with side walls 38 and 40, front wall 34 and back wall 36. Top 42 is smoothly molded to front wall 34, back wall 36 and side walls 40 and 38. Top 42 is positioned substantially parallel to crowned bottom 24.

Handle 14 is hollow and contains a hollow reservoir stem portion 44. Reservoir stem portion 44 ends in a flared reservoir connector 46. Flared reservoir connector 46 is formed integral with back wall 36 of upper portion 20. Flared connector portion 46 opens into an aperture 48 formed in back wall 36. A carrier portion 50, which is hollow, is formed integral with stem portion 44. Carrier portion 50 is positioned at approximately a 45° angle to stem portion 44. Carrier portion 50 is also positioned substantially parallel to back wall 36 of upper portion 20. A pouring grip portion 52 is formed integral with carrier portion 50. Grip portion 52 is positioned at approximately a 75° angle to carrier portion 50. Grip portion 52 is also hollow. A vent aperture 54 is formed in a middle portion of grip portion 52. Grip portion 52 is formed integral with a spray head connector portion 56. Spray head connector 56 is formed integral with top 42 of reservoir 13. Spray head connector 56 includes a threaded collar 58. Threaded collar 58 opens into reservoir 13.

Sprayer 12 is a conventional spray pump, having a spray piston 60, a threaded sealing collar 62 and a draw tube 64. In the present embodiment a Continental Glass FM-6 Mini-Mist Sprayer, is employed. It would be obvious to one skilled in the art to employ a sprayer which is similar or equivalent to the Continental Glass FM-6 Mini-Mist Sprayer. Sprayer 12 is threadedly and sealingly engaged to threaded collar by threaded sealing collar 62. Draw tube 64 of sprayer 12 extends approximately ⅛ of the distance into bottom portion 22 of reservoir 13. Draw tube 64 is positioned with an open end 66 below aperture 48 in side wall 36.

A pouring spout 18 is formed integral with front wall 34, opposite handle 14. Spout 18 is a curved, tapering spout. Spout 18 is formed integral with front wall 34 adjacent a spout aperture 68. A lower portion of spout aperture 68 is positioned immediately adjacent to front wall 26. The lower portion of spout aperture 68 is positioned at the same height as a lower portion of handle aperture 48. Spout 18 is hollow and tapers into a pouring aperture 70. A lower portion of pouring aperture 70 is below vent hole 54. Pouring aperture 70, sprayer 16 and vent hole 54 are collinear.

In use, watering can 10 is filled by unscrewing sprayer 12 from threaded collar 62. Sprayer 12 is then lifted out of reservoir 13 and water is poured into reservoir 13. After watering can 10 is filled with water, sprayer 12 can be re-threaded onto threaded collar 62 to once again close collar 58. Watering can 10 is then ready to be used as any other conventional watering can.

Watering can 10 can be gripped at either portion 52 of handle 14 or at carrying portion 50 of handle 14 as long as vent hole 54 is not covered. Vent hole 54 allows smooth pouring of water from spout aperture 70 without splashing, since air is drawn into vent hole 54 and down into reservoir 13. Likewise, spray head 60 can be used at the same time to spray plants by simply grasping grip portion 52 of handle 14 and placing a thumb on spray head 60 to pump sprayer 12.

Furthermore, vent hole 54 can be covered while watering can 10 is being carried to lessen the likelihood that water will be splashed out of spout 18. Vent hole 54 also allows better control over pouring from spout 18 since a stream of water flowing from spout 18 can be slowed or stopped by covering vent hole 54 thus lessening the likelihood of spills.

Watering can 10 is composed of polyethylene in this embodiment. Watering can 10 is manufactured by blow-molding container 11 and threading sprayer 12 to container 11.

It may therefore be appreciated that watering can 10 provides a watering can which can both water plants and mist them at the same time. Watering can 10 is inexpensive to manufacture since it is composed of blow-molded polyethelene. Watering can 10 includes a large reservoir section which can hold a large quantity of water so that a number of watering operations can be performed without the necessity of refilling.

Although a specific embodiment of the present invention has been described in detail above, it is readily apparent that those skilled in the art may make various modifications and changes in the present invention without departing from the spirit and scope thereof. It is to be expressly understood that the instant invention is limited only by the appended claims.

What is claimed is:

1. A spraying and watering can adapted to deliver selectively water or water mist to a plant comprising: a blow-molded polyethylene integral container having a substantially closed reservoir, said reservoir having a substantially rectangular bottom, said bottom being crowned inward of the reservoir to improve the stability of the container, said reservoir having a lower portion formed integral with the bottom, an upper portion formed integral with the lower portion and having a substantially rectangular top formed integrally therewith, a hollow generally C-shaped handle having its lower end formed integral with a narrower side of the upper portion adjacent to the junction of the upper portion with the lower portion, said handle having an upper end formed integral with the top adjacent to the center of the top, said handle having a grip portion adjacent to the top to provide a convenient means for holding the container, said hollow handle providing a conduit between the portion of the reservoir adjacent to the junction between the upper portion and the lower portion and the top of the reservoir, said handle having a vent in the grip portion adjacent to the junction of the handle with the top of the reservoir, a curved tapered spout having one end formed integral with a narrower side of the upper portion opposite the side having the lower end of the handle formed integral therewith and the other end having an opening for pouring water from said reservoir, a sprayer sealingly mounted in the top adjacent to the center of the top and positioned in line with the handle and the spout and being positioned between the handle and the spout adjacent to the upper end of the handle, and said sprayer having a draw tube extending into the lower portion of the reservoir, whereby the sprayer may be operated conveniently by an operator holding the container at the grip portion.

* * * * *